April 4, 1961 P. E. BIEMILLER ET AL 2,977,750
INDEXING MECHANISM
Filed Jan. 2, 1957 3 Sheets-Sheet 1

INVENTOR
Philip E. Biemiller
Kenneth H. Schoenrock

BY *M. T. Gould*
ATTORNEY

April 4, 1961 P. E. BIEMILLER ET AL 2,977,750
INDEXING MECHANISM
Filed Jan. 2, 1957 3 Sheets-Sheet 3

INVENTOR
Philip E. Biemiller
Kenneth H. Schoenrock

BY *m.w.Gould*

ATTORNEY

United States Patent Office 2,977,750
Patented Apr. 4, 1961

2,977,750

INDEXING MECHANISM

Philip E. Biemiller, Landisville, and Kenneth H. Schoenrock, Rheems, Pa., assignors to Hamilton Watch Company, Lancaster, Pa., a corporation of Pennsylvania Filed Jan. 2, 1957, Ser. No. 632,176

1 Claim. (Cl. 58—28)

This invention relates to an indexing mechanism for a battery driven electric watch, and more especially to that portion of the mechanism which places the wheel being indexed in the proper position for contact with the oscillating indexing pin.

In self-contained, battery operated, electric watches having an oscillating balance wheel serving as the motive power, it is necessary to provide an indexing mechanism which will receive the power from the oscillating movement of the balance wheel and transform these oscillations into rotary motion in one direction. Generally speaking, this is done with a toothed wheel being advanced step by step by means of periodic contact, through a portion of the arc, with the oscillating balance wheel. Heretofore, mechanical detenting or locking means have been used on the toothed wheel. These mechanical means have taken the form of a pawl or detent which physically engages the teeth of the indexing wheel. Such an arrangement generally presents many difficulties including the fabrication of the many parts making up the pawl mechanism and the necessity of lubrication to reduce friction and to prevent wear.

This invention attempts to eliminate the fabrication of numerous parts, the need for lubrication, and the problem of wear, and at the same time provides means for properly positioning, without physical engagement, the toothed wheel in the path of movement of the oscillating balance wheel so that the toothed wheel may be indexed step by step, thus transforming oscillatory motion to unidirectional rotary motion.

In order to accomplish this we provide a particular type of magnetic indexing arrangement in which one or more magnets cooperate with a toothed wheel to provide a resilient indexing mechanism. While magnetic positioning devices have been used in the past these have generally consisted of toothed wheels having one or more magnets arranged radially therearound with their magnetic axes perpendicular to the balance staff. We have found such arrangements to be generally unsatisfactory when an attempt is made to incorporate them in an electric watch.

In the first place the space available in such a watch is severely limited and there is a primary need to limit or at least control the stray magnetic field produced. Further, the use of radial magnets and radial magnetic axes to a certain extent dictates the shape of the teeth which must be provided and in many instances the tooth shape dictated by magnetic considerations is unsatisfactory for cooperation with the roller jewel normally used to drive the index wheel. In such a situation one wheel must be provided for indexing and another for detenting. The designers freedom in magnet placement is extremely limited since movement of the magnet away from the wheel merely reduces the magnetic attraction, while movement around the wheel upsets and destroys the indexing function.

According to our invention we have found that greatly improved indexing can be achieved in an electric watch if a magnetic indexing arrangement is utilized wherein at least one magnet cooperates with a toothed wheel with the magnetic axis of the magnet generally perpendicular to the wheel and generally parallel to the wheel staff. Tooth shape may be dictated by the interaction desired between the wheel and indexing or roller jewel, while the magnet may be moved radially toward or away from the wheel staff to provide optimum interaction between the magnet and teeth. The index wheel may thus simultaneously serve both as an index wheel and as a magnetic detent wheel, while permitting optimum operating characteristics to perform both functions. Stray fields may be limited and the space required for the magnets may be located in a position in the watch in which it is most readily available.

It is accordingly an important object of the invention to provide an improved indexing mechanism which is magnetically positioned in the path of movement of an indexing pin carried on an oscillating balance wheel.

Another object of the invention is to provide an improved magnetic indexing mechanism for use in an electric watch including a toothed wheel and at least one magnet cooperating with such wheel and having its magnetic axis generally parallel to the axis of rotation of such wheel.

A further object of the invention is to provide permanent magnets carried beneath the teeth of a wheel to be indexed to position said wheel properly so that succeeding teeth will be in the path of movement of an indexing pin carried on an oscillating balance wheel.

A still further object of the invention is to provide one or more permanent magnets adapted to be located beneath the teeth of a wheel to be indexed, to position succeeding teeth in the path of movement of a pin carried by an oscillating balance wheel, and to act on succeeding teeth to move the indexing wheel clockwise with either clockwise or counter-clockwise motion of the balance wheel, advancing the wheel with a counter-clockwise movement of the balance wheel and restoring the indexing wheel after clockwise movement of said balance wheel.

It is another object of the invention to provide a magnetic watch indexing mechanism which permits magnet placement at available positions in the watch and which provides a limitation on stray magnetic fields.

A still further object of the present invention is to provide a watch indexing mechanism having one or more permanent magnets located beneath the teeth of a ferromagnetic wheel connected to one of the indexing wheels of an electric watch and to position, through magnetic attraction, the teeth of the indexing wheels with relation to the indexing jewel pin.

It is a still further object of the present invention to provide a watch indexing mechanism having one or more permanent magnets which serve to eliminate the variable friction of an ordinary mechanical pawl and ratchet mechanism, as well as the wear of the mechanical parts.

The invention is shown in the accompanying drawings in which.

Figure 2:
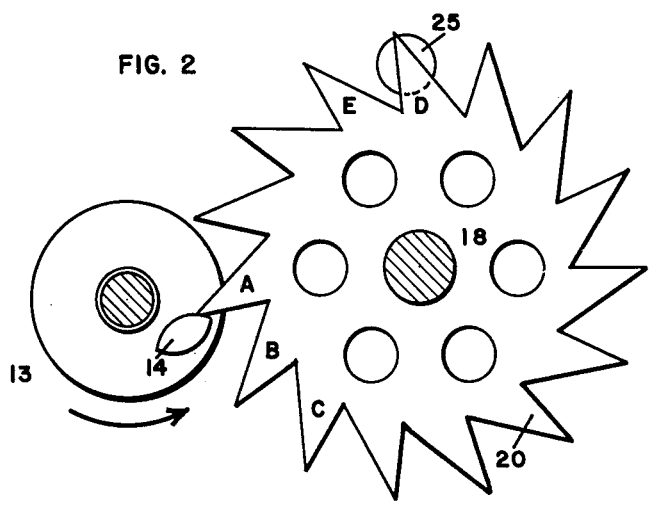
Figure 2 is a plan view showing the oscillating pin and the wheel to be indexed with the magnetic detent.

Figures 3, 4, 5, and 6 are views similar to Figure 2 showing the different positions of the oscillating pin and wheel to be indexed during a cycle of operation.

Figure 7:
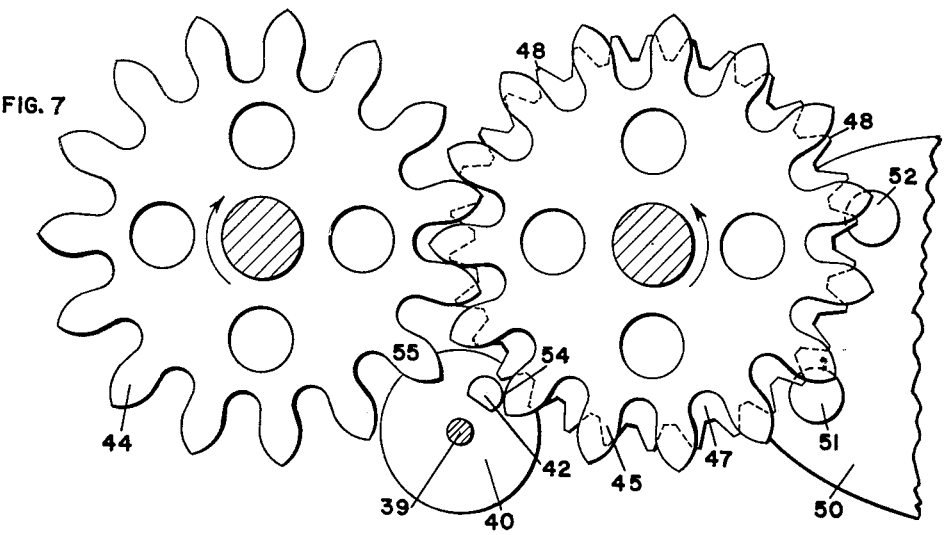

Figure 7 is a top plan view showing a pair of indexing wheels which is a modification of the invention.

Figure 8:
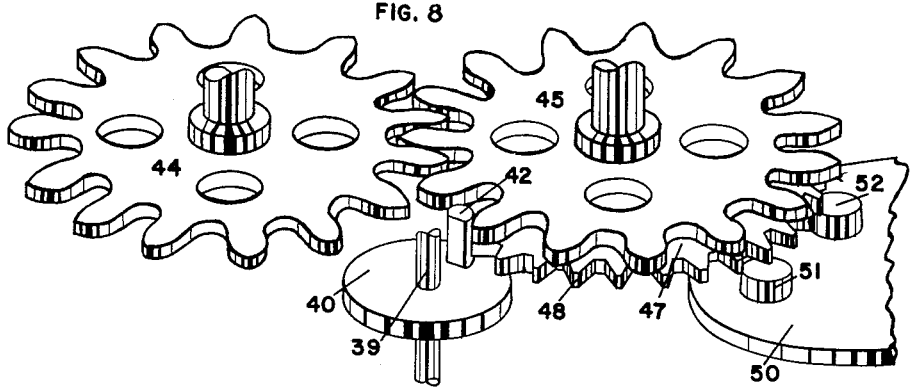

Figure 8 is a perspective view of the modification shown in Figure 7.

Figure 1:
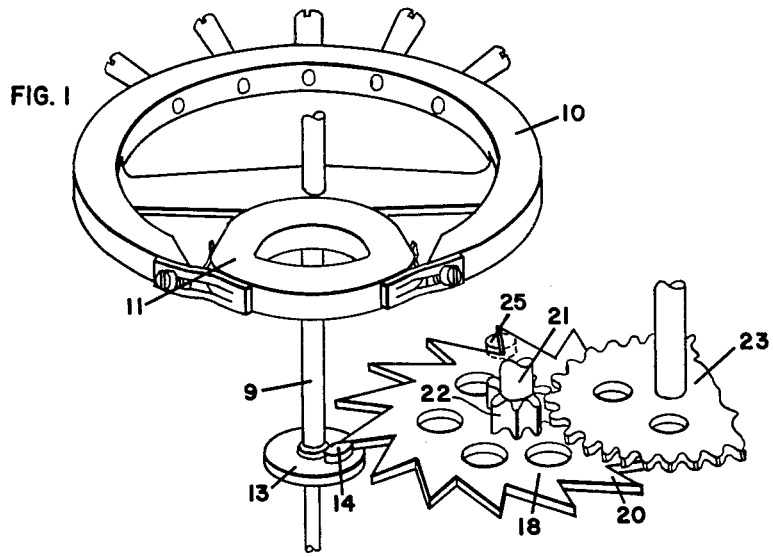
Figure 1 is a perspective view of the oscillating balance wheel and the index wheel of a self-contained battery operated electric watch.

Referring to Figure 1, a balance staff 9 is mounted in the ordinary pivots (not shown) and supports a balance wheel 10 carrying a coil 11. The balance wheel through the medium of the coil and a magnetic field (not shown) is kept in oscillating motion of approximately 225° without exceeding 315° in each direction from a rest position. Supported on the balance staff is a roller 13 carrying a jeweled indexing pin 14.

An indexing wheel 18 having teeth 20 is pivotally mounted in the pillar plate and a bridge, neither of which is shown in the drawing, so that the teeth 20 are in the path of oscillating movement of the indexing jewel 14. The shaft 21 supporting the indexing wheel 18 also carries a pinion 22 which is in mesh with wheel 23 which is part of the train. Oscillating movement of the balance wheel 10 is thus transferred to rotary motion in one direction of the watch train.

The teeth 20 of the wheel 18 are formed having one side generally radial with respect to the indexing wheel so as to present a surface which substantially corresponds to the line of centers between the indexing wheel and the balance wheel at the time the indexing jewel pin contacts the indexing wheel moving in a counterclockwise direction. At the same time it presents a surface which is at an acute angle to the line of centers between the indexing wheel and the balance wheel at the time when contact is made when the pin is travelling in a clockwise direction. The indexing pin 14 is of convex shape presenting a curved surface to the teeth of the indexing wheel, and is so positioned as to produce a greater movement of the indexing wheel when the indexing pin is traveling in a counterclockwise direction than when it is traveling in a clockwise direction.

A permanent magnet 25 of substantially cylindrical shape and having a diameter approximately equal to the base width of the teeth is positioned below the indexing wheel so that its flux is at right angles to the path of rotation of said wheel, and parallel to the axis of rotation of the wheel. The magnet is placed so that when the indexing wheel is in position to be contacted by the indexing pin, the magnet is centrally located with regard to the particular overlying tooth of the indexing wheel.

Figure 3:
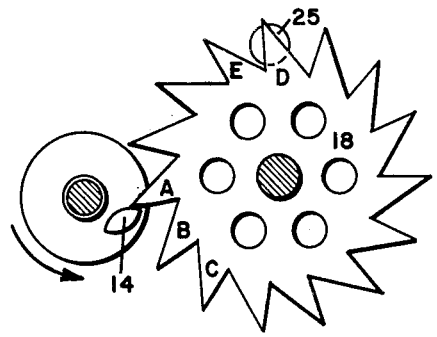
Figure 4:
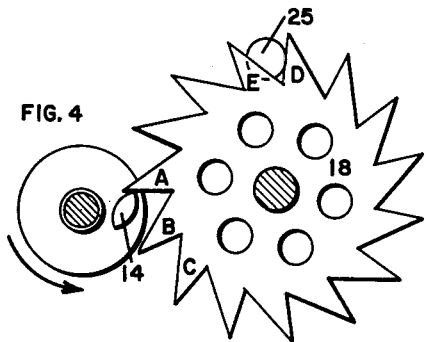
Figure 5:
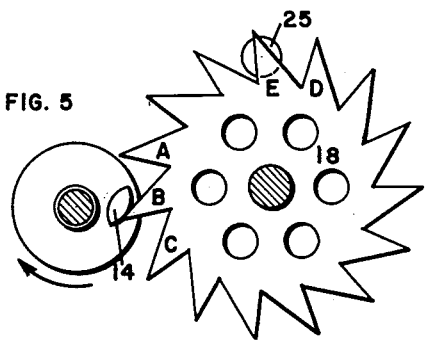

Referring to Figures 3-6 which show different positions of the indexing wheel relative to the indexing pin during a cycle of operations of the balance wheel, Figure 3 shows the initial contact between the indexing pin 14 and a tooth A of the indexing wheel when the balance wheel is moving in a counter-clockwise direction. At this time the magnet 25 is positioned centrally beneath the tooth D. Figure 4 shows the wheel substantially at the end of the contacting period with the pin 14 when the balance wheel is moving in a counter-clockwise direction, showing that the tooth A has been moved clockwise to present the tooth E partially over the magnet 25 and moving the tooth D substantially free of the magnet 25. The inertia of the wheel 18 moves the tooth E slightly farther in a clockwise direction and the attraction of the magnet assists in positioning the tooth E, as shown in Figure 5, which is substantially centrally over the magnet 25. It will be seen that the movement of the indexing wheel 18 is partially accomplished through the attraction between the magnet 25 and the teeth of the wheel, as well as from the impact between the indexing pin 14 and the teeth 20.

Figure 6:
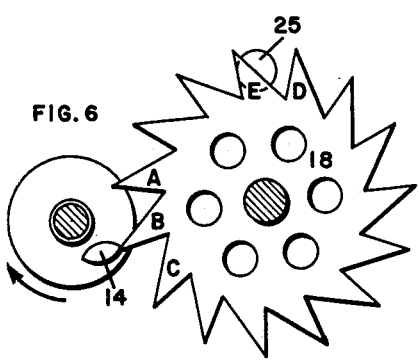

In Figure 5 the indexing wheel 18 has been positioned by the magnet 25 so that the tooth B is in the path of movement of the indexing pin 14 and at the point of contact with that pin. Movement of the balance wheel in a clockwise direction now moves the tooth B to a point of disengagement with the pin 14, as shown in Figure 6. At this position the tooth E has been moved but slightly across the flux path of the magnet 25 and after contact is broken between the pin 14 and the tooth B, the magnet 25 again centers the tooth E in the position shown in Figure 5 with, however, the indexing pin 14 adapted to engage the tooth B on its next succeeding counter-clockwise movement.

It will be seen that the magnetic attraction passes to a successive tooth only when the indexing wheel is advanced in a clockwise movement. By moving the magnet 25 toward or away from the staff or shaft of the wheel 18 it is possible to adjust the interaction of the magnet and teeth to provide optimum detent action.

Referring to the modification shown in Figures 7 and 8, a balance staff 39 is shown with a roller 40 which carries an indexing jewel 42. The balance staff 39 oscillates with the balance wheel and brings the indexing jewel 42 alternately into engagement with teeth of the indexing wheels 44 and 45. In this way each of the indexing wheels is moved the distance of half a tooth with each contact with the indexing jewel.

Carried directly below the indexing wheel 45 is a positioning wheel 47 made of ferromagnetic material and having teeth 48. The wheel 47 has exactly twice as many teeth as either of the indexing wheels so that the movement of half a tooth of one of the indexing wheels is equal to the movement of a whole tooth of the positioning wheel. A plate 50 located partially beneath the positioning wheel carries permanent magnets 51 and 52.

The permanent magnets 51 and 52 are positioned on the plate so that teeth separated by the distance of the magnets from each other are simultaneously positioned directly above the centers of the magnets, and when in this position the indexing wheels 44 and 45 are in proper position to be struck by the oscillating indexing jewel 42 during the next semi-oscillation. The magnets serve as a positioning means, causing the wheel 47 to move in slight jerks as the wheels 44 and 45 are advanced by impact of the jewel 42 on the teeth of these wheels, the motion being arrested by the attraction of the magnets which tends to hold the teeth 48 centered in the magnetic fields.

With the use of the magnetic positioning means, the teeth of the indexing wheels 44 and 45 are positioned exactly so that the oscillating jewel 42 does not strike against the teeth in its back swing. In other words, referring to Figure 7, which is an instantaneous view partway through the cycle with the indexing jewel 42 traveling in a clock-wise direction, the impact is at the point 54 and the tooth is moved during contact with the pin 42 and held in a position by reason of the magnet, so that on the back swing or movement of the indexing jewel 42 in a counter-clockwise direction the following tooth is not engaged by the jewel. The jewel swings free of the following tooth and engages the tooth 55 of the wheel 44 which has been moved into contacting position by reason of being geared with the wheel 45.

Likewise, when the balance wheel swings backward in a clockwise direction, the indexing jewel 42 does not strike the tooth following the tooth 55 on the wheel 44. The magnet serves to arrest the motion of the wheels 44 and 45, limiting that motion so that this wheel is advanced only one tooth per semi-oscillation of the jewel 42. Inasmuch as the wheel 47 is connected to the wheel 45 and to wheel 44, the teeth of the indexing wheels 44 and 45 are held in a correct position. Likewise, the magnet has a tendency to pull the positioning wheel teeth into position should the impact of the jewel 42 not be sufficient to advance the tooth the complete distance. The use of the magnetic positioning means is vastly superior to a mechanical pawl inasmuch as it positions rather than locks and eliminates wear.

The wheel 47 is preferably made of hardened steel having the characteristics of a permanent magnet with a comparatively high residual magnetism. This produces better behavior in the watch should the watch come into an external magnetic field.

There are two arrangements in which the magnets may be positioned, each of which has its advantages. In both instances the magnets used must be made from a material having a high coercive force in order to avoid possible demagnetization of the magnets should the watch be brought into an external magnetic field. The magnets also must have relatively high residual magnetism so that they have sufficient attraction for the teeth of the wheel being indexed. In the first arrangement the magnets are placed in the pillar plate directly below the teeth of the wheel with their north poles uppermost, north poles being referred to only as an example since it will be apparent that the south poles could equally effectively be positioned uppermost. In this position the magnets create an induced magnet in the wheel with the teeth of the wheel becoming south poles, and being successively energized by the permanent magnets to be attracted sufficiently so that the magnets act as a positioning means.

In the foregoing magnet arrangement the force between the teeth of the wheel and the magnets is one of attraction. With the other magnet arrangement the uppermost pole of one of the magnets is north, while the uppermost pole of the other magnet is south. This means that the teeth which are attracted by these permanent magnets must reverse their polarity between magnets and until this polarity is reversed there will be a repulsion between the magnet and the teeth of the wheel. This repulsion serves a very useful purpose in that it tends to hold the wheel in position until it is positively moved by the indexing jewel. The magnets in the second case must have sufficient residual magnetism to overcome the magnetism of the teeth and reverse the polarity.

The magnets serving as a positioning means are, comparatively speaking, very small and the ferromagnetic wheel positioned above the magnets serves as a shunt. Both of these factors tend to limit the extent of the magnetic field so that the timekeeping qualities of the watch will not be affected.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

We claim:

In a battery operated electric watch, an oscillating balance wheel, an indexing jewel carried by said balance wheel, a toothed wheel indexed by said jewel, and a cylindrical permanent magnet located adjacent said toothed wheel on only one side of its plane of rotation with the flux path from said permanent magnet at right angles to the plane of rotation of said toothed wheel being indexed, said permanent magnet having a diameter substantially equal to the base width of the teeth of said toothed wheel and acting to position said toothed wheel by advancing said toothed wheel into a neutral position after its is indexed by said jewel in one direction and returning said toothed wheel to said neutral position after it is indexed by said jewel in the other direction.

References Cited in the file of this patent

UNITED STATES PATENTS

| | | |
|---|---|---|
| 2,195,311 | Hurst | Mar. 26, 1940 |
| 2,757,545 | Ensign et al. | Aug. 7, 1956 |
| 2,847,818 | Junghans et al. | Aug. 19, 1958 |

FOREIGN PATENTS

| | | |
|---|---|---|
| 1,076,227 | France | Apr. 21, 1954 |